United States Patent
Matsuzaki et al.

(10) Patent No.: US 12,553,472 B2
(45) Date of Patent: Feb. 17, 2026

(54) ANGULAR BALL BEARING

(71) Applicant: NSK LTD., Tokyo (JP)

(72) Inventors: Haruka Matsuzaki, Gunma (JP);
Nobuhiko Nishimura, Gunma (JP);
Chiharu Shigeta, Gunma (JP); Shinji Fujita, Gunma (JP)

(73) Assignee: NSK LTD., Tokyo (JP)

(*) Notice: Subject to any disclaimer, the term of this patent is extended or adjusted under 35 U.S.C. 154(b) by 242 days.

(21) Appl. No.: 18/286,411

(22) PCT Filed: Jan. 17, 2022

(86) PCT No.: PCT/JP2022/001448
§ 371 (c)(1),
(2) Date: Mar. 11, 2024

(87) PCT Pub. No.: WO2022/219868
PCT Pub. Date: Oct. 20, 2022

(65) Prior Publication Data
US 2025/0283511 A1    Sep. 11, 2025

(30) Foreign Application Priority Data
Apr. 13, 2021 (JP) ................. 2021-067849

(51) Int. Cl.
*F16C 33/58* (2006.01)
*F16C 19/16* (2006.01)

(52) U.S. Cl.
CPC .......... *F16C 33/588* (2013.01); *F16C 19/163* (2013.01); *F16C 33/583* (2013.01); *F16C 33/586* (2013.01)

(58) Field of Classification Search
CPC .... F16C 19/163; F16C 33/583; F16C 33/585; F16C 33/586; F16C 33/588
See application file for complete search history.

(56) References Cited

U.S. PATENT DOCUMENTS 4,722,617 A * 2/1988 Stella ............... F16C 33/588
                                                    384/526
5,002,404 A * 3/1991 Zernickel ........... F16C 41/007
                                                    384/515

(Continued)

FOREIGN PATENT DOCUMENTS

DE    7013862 U    7/1970
DE    6906278 U    3/1971

(Continued)

OTHER PUBLICATIONS

Machine Translation of JP-2004245391-A (Year: 2004).*
(Continued)

*Primary Examiner* — Alan B Waits
(74) *Attorney, Agent, or Firm* — Sughrue Mion, PLLC

(57) ABSTRACT

An angular ball bearing includes an outer ring having an outer ring raceway surface, an inner ring having an inner ring raceway surface, and a plurality of balls being rollable between the outer ring raceway surface and the inner ring raceway surface at a contact angle, a bearing ring of at least one of the outer ring and the inner ring being a press-formed product of a steel plate. The bearing ring includes an extending portion extending in an axial direction from the raceway surface toward a side opposite to a side on which a line of action of the contact angle relative to a center of the ball passes through the raceway surface. The extending portion has a bent portion bent in a radial direction and the bent portion overlaps the ball when viewed from the axial direction so as to define an overlap allowance.

7 Claims, 9 Drawing Sheets

(56) References Cited

U.S. PATENT DOCUMENTS

| | | |
|---|---|---|
| 6,287,013 B1 | 9/2001 | Loncar et al. |
| 2001/0007600 A1 | 7/2001 | Tajima et al. |
| 2010/0021099 A1 | 1/2010 | Torii |
| 2020/0300299 A1 | 9/2020 | Tanaka et al. |

FOREIGN PATENT DOCUMENTS

| | | | |
|---|---|---|---|
| DE | 199 13 211 A1 | 9/2000 | |
| DE | 102014200479 A1 * | 7/2015 | ........... B62D 5/0421 |
| JP | 59-40618 U | 3/1984 | |
| JP | 64-35117 A | 2/1989 | |
| JP | 7-77217 A | 3/1995 | |
| JP | 2001-193745 A | 7/2001 | |
| JP | 2004-197920 A | 7/2004 | |
| JP | 2004245391 A * | 9/2004 | .......... F16C 33/3806 |
| JP | 2007-46636 A | 2/2007 | |
| JP | 2009-52709 A | 3/2009 | |
| JP | 2019-27586 A | 2/2019 | |
| WO | WO-2019021544 A1 * | 1/2019 | ............ F16C 33/767 |

OTHER PUBLICATIONS

Machine Translation of DE-102014200479-A1 (Year: 2015).*
Machine Translation of WO-2019021544-A1 (Year: 2019).*
Extended European Search Report dated Oct. 4, 2024, issued by the European Patent Office in counterpart European Patent Application No. 22787796.6.
International Search Report (PCT/ISA/210) dated Mar. 15, 2022, issued by the International Searching Authority in counterpart International Application No. PCT/JP2022/001448.
Written Opinion (PCT/ISA/237) dated Mar. 15, 2022, issued by the International Searching Authority in counterpart International Application No. PCT/JP2022/001448.

* cited by examiner

ANGULAR BALL BEARING

CROSS-REFERENCE TO RELATED APPLICATIONS

This application is a National Phase Entry of PCT International Application No. PCT/JP2022/001448 filed on Jan. 17, 2022, which claims priority to Japanese Patent Application No. 2021-067849 filed on Apr. 13, 2021, the contents of all of which are incorporated herein by reference in their entirety.

TECHNICAL FIELD

The present invention relates to an angular ball bearing, and more particularly to an angular ball bearing in which at least one bearing ring of an outer ring and an inner ring is formed by pressing.

BACKGROUND ART

An example of an angular ball bearing used for a clutch mechanism or the like of an automobile includes a bearing that can prevent separation of an outer ring or an inner ring after completion of assembly and support integral handling of the bearing. Such a bearing has an advantage of being easy to convey or be assembled to an apparatus.

Patent Literature 1 discloses a wheel bearing device including an outer member, an inner member (a hub wheel and an inner ring), and double rows of balls interposed between the outer member and the inner member, in which a raceway surface and convex portions provided in a vicinity of the raceway surface are processed by grinding at the same time relative to the inner member made of steel, and the bearing would not be separated due to interference between the balls and the convex portions.

There is further known an angular ball bearing in which a bearing ring (an outer ring and an inner ring) is manufactured by pressing a metal plate member.

For example, Patent Literature 2 discloses a wheel bearing in which a rolling surface and counter portions provided in a vicinity of the rolling surface are formed at the same time on a bearing ring by pressing or cold-rolling, the rolling surface and the counter portions are freely subjected to grinding after heat treatment, and the bearing ring would not be separated due to interference between the counter portions and balls.

Patent Literature 3 discloses a ball bearing in which inner and outer rings formed by pressing a steel plate are provided with engagement portions continuously in a part extending continuously with at least one of a bent portion of the outer ring and a radially extending portion of the inner ring, and the outer ring and the inner ring are engaged by the engagement portions to be not separated.

CITATION LIST

Patent Literature

Patent Literature 1: JP2001-193745A
Patent Literature 2: JP2009-052709A
Patent Literature 3: JP2004-197920A

SUMMARY OF INVENTION

Technical Problem

In the ball bearing described in Patent Literature 1, the convex portions for making the bearing not separated are formed at the same time as the raceway surface by grinding, and a high grinding cost is an obstacle in reducing the cost of the bearing.

In the wheel bearing described in Patent Literature 2, groove shoulders are filled with a material during the rolling, and thus a thickness of a part through which a contact angle of the groove shoulder passes may be small.

In the ball bearing described in Patent Literature 3, the outer ring and the inner ring are engaged by the engagement portions provided on the outer ring or the inner ring, so that the bearing would not be separated, and the outer ring or the inner ring is required for a shape for forming the engagement portions, which may increase an axial size of the bearing.

The present invention is made in view of the above-described problems, and an object of the present invention is to provide an angular ball bearing that can be manufactured at a low cost, and has good handleability by preventing separation of a bearing ring and balls.

Solution to Problem

The above object of the present invention is achieved by following configurations.

(1) An angular ball bearing, the angular ball bearing including an outer ring having an outer ring raceway surface on an inner circumferential surface of the outer ring, an inner ring having an inner ring raceway surface on an outer circumferential surface of the inner ring, a plurality of balls being rollable between the outer ring raceway surface and the inner ring raceway surface at a contact angle, and a cage holding the plurality of balls at predetermined intervals in a circumferential direction, a bearing ring of at least one of the outer ring and the inner ring being a press-formed product of a steel plate, in which
the bearing ring includes an extending portion extending in an axial direction from the raceway surface toward a side opposite to a side on which a line of action of the contact angle relative to a center of the ball passes through the raceway surface, and
the extending portion has a bent portion bent in a radial direction, and the bent portion is provided in an entire circumference or at least at two portions in a circumferential direction, overlaps the ball when viewed from the axial direction so as to define an overlap allowance.

Advantageous Effects of Invention

According to the angular ball bearing of the present invention, it is possible to provide an angular ball bearing that can be manufactured at a low cost, and has good handleability by preventing separation of a bearing ring and balls.

DESCRIPTION OF EMBODIMENTS

Hereinafter, embodiments of an angular ball bearing according to the present invention will be described in detail with reference to the drawings.

First Embodiment

Figure 1:
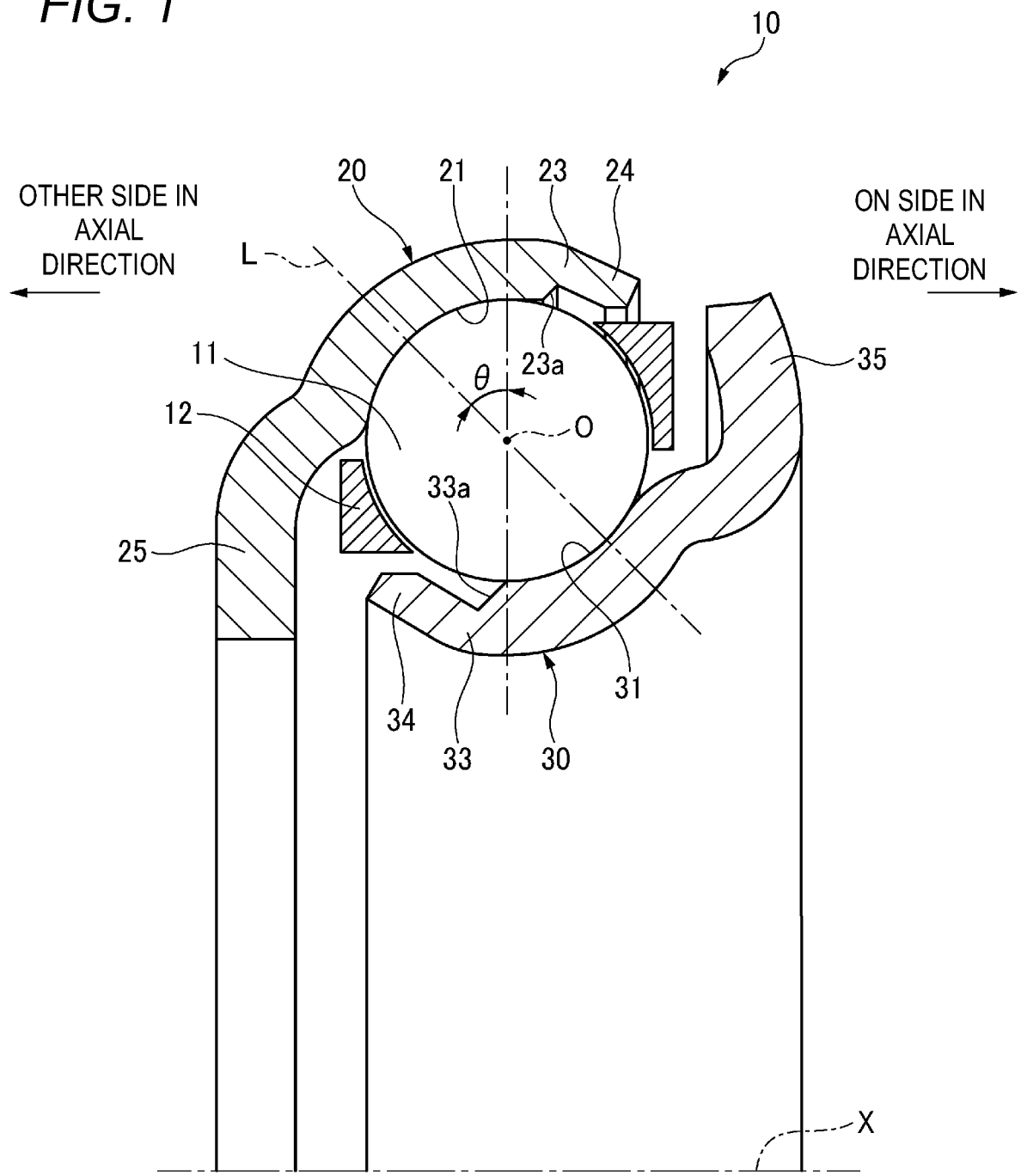
FIG. 1 is a sectional view of a main portion of an angular ball bearing according to a first embodiment of the present invention.

As illustrated in FIG. 1, an angular ball bearing 10 is, for example, a clutch release bearing used in a clutch mechanism of an automobile, and includes a substantially circular outer ring 20 having an outer ring raceway surface 21 on an inner circumferential surface thereof, a substantially circular inner ring 30 having an inner ring raceway surface 31 on an outer circumferential surface thereof, a plurality of balls 11 that are rollable between the outer ring raceway surface 21 and the inner ring raceway surface 31 and are in contact with both the raceway surfaces 21 and 31 at a prescribed contact angle θ, and a double-supported cage 12 holding the plurality of balls 11 at prescribed intervals in a circumferential direction.

The cage 12 may be of a cantilever type such as a crown-shaped cage.

The outer ring 20 and the inner ring 30 are press-formed products of a steel plate. Specifically, the outer ring 20 and the inner ring 30 are formed by pressing a plate member of an alloy material containing 0.7 wt % to 0.9 wt % of carbon, 0.3 wt % to 0.9 wt % of manganese, 0.3 wt % to 1.0 wt % of chromium, and 0.01 wt % to 0.15 wt % of silicon.

Figure 2A:
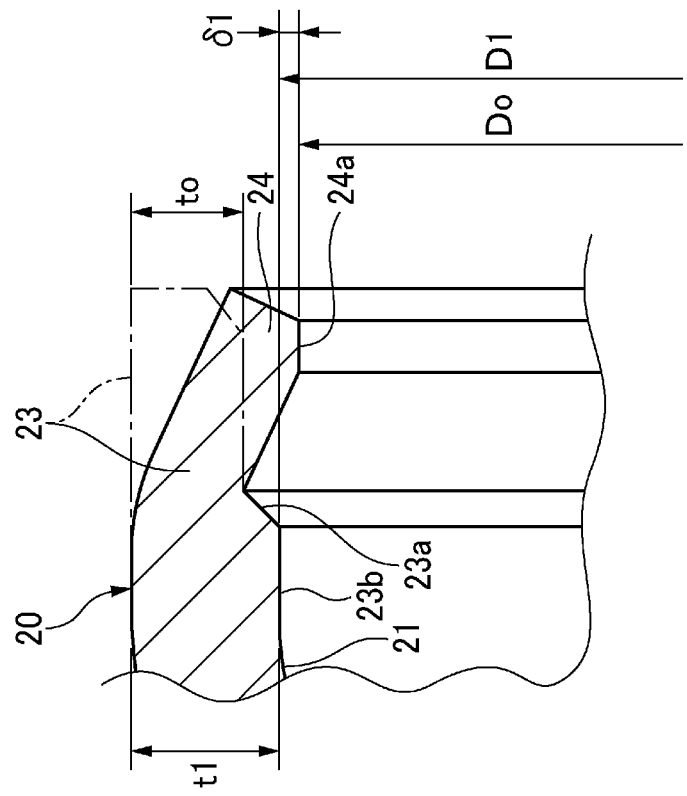
FIG. 2A is an enlarged view of a main portion illustrating a shape of a bent portion of an outer ring.

As illustrated in FIG. 1 and FIG. 2A, the outer ring 20 includes a substantially cylindrical outer ring extending portion 23 axially extending from the curved outer ring raceway surface 21 toward one side in an axial direction (rightward direction in FIG. 1 and FIGS. 2A and 2B), and a flange portion 25 curved in the axial direction and further extending radially inward on the other side in the axial direction (leftward direction in FIG. 1) relative to the outer ring raceway surface 21.

The outer ring 20 further includes a step portion 23a obtained by pressing to deform an inner circumferential surface of the outer ring extending portion 23 constituting the outer ring 20 to an outer diameter side relative to an inner circumferential surface of a part constituting the outer ring raceway surface 21. The step portion 23a has a plate thickness t0 that is smaller than a plate thickness t1 of the part constituting the outer ring raceway surface 21. The outer ring extending portion 23 is provided with, on the inner circumferential surface, a counter portion 23b having a cylindrical surface shape between the outer ring raceway surface 21 and the step portion 23a. The counter portion 23b has the same inner diameter as an inner diameter of a groove bottom portion (maximum inner diameter portion) of the outer ring raceway surface 21.

Further, the outer ring extending portion 23 is provided with a bent portion 24 over an entire circumference that is obtained by pressing to bend the outer ring extending portion 23 to an inner diameter side and reducing an inner diameter of a tip portion thereof. The bent portion 24 is provided with, at a tip portion of an inner circumferential surface thereof, a chamfered portion 24a substantially parallel to an axis X of the angular ball bearing 10. The step portion 23a is provided between the outer ring raceway surface 21 and the bent portion 24.

Figure 2B:
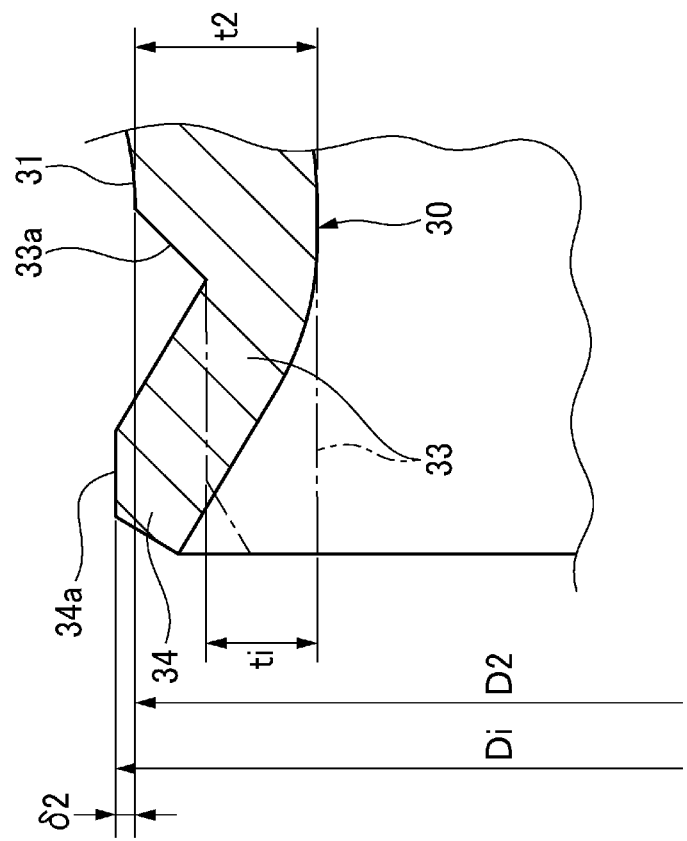
FIG. 2B is an enlarged view of a main portion illustrating a shape of a bent portion of an inner ring.

Similarly, as illustrated in FIG. 1 and FIG. 2B, the inner ring 30 includes a substantially cylindrical inner ring extending portion 33 axially extending from the curved inner ring raceway surface 31 toward the other side in the axial direction, and a flange portion 35 curved in the axial direction and further extending radially outward on the one side in the axial direction relative to the inner ring raceway surface 31.

The inner ring 30 further includes a step portion 33a obtained by pressing to deform an outer circumferential surface of the inner ring extending portion 33 constituting the inner ring 30 to the inner diameter side relative to an outer circumferential surface of a part constituting the inner ring raceway surface 31. The step portion 33a has a plate thickness ti that is smaller than a plate thickness t2 of the part constituting the inner ring raceway surface 31. The inner ring extending portion 33 does not include a counter portion, and an end portion of the step portion 33a on a radially outer side has the same axial position as a center O of the ball 11.

Further, the inner ring extending portion 33 is provided with a bent portion 34 over an entire circumference that is obtained by pressing to bend the inner ring extending portion 33 to the outer diameter side and increasing an outer diameter of a tip portion thereof. The bent portion 34 is provided with, at a tip portion of an outer circumferential surface thereof, a chamfered portion 34a substantially parallel to the axis X of the angular ball bearing 10. The step portion 33a is provided between the inner ring raceway surface 31 and the bent portion 34.

Regarding the outer ring 20, the one side in the axial direction is a side opposite to a side on which a line of action L of the contact angle θ relative to the center O of the ball 11 passes through the outer ring raceway surface 21 in the axial direction. Accordingly, the other side in the axial direction is the side on which the line of action L of the contact angle θ relative to the center O of the ball 11 passes through the outer ring raceway surface 21. Regarding the inner ring 30, the other side in the axial direction is a side opposite to a side on which the line of action L of the contact angle θ relative to the center O of the ball 11 passes through the inner ring raceway surface 31 in the axial direction, and the one side in the axial direction is the side on which the line of action L of the contact angle θ relative to the center O of the ball 11 passes through the inner ring raceway surface 31.

Accordingly, in the outer ring 20, the bent portion 24 (chamfered portion 24a) has an inner diameter Do that is smaller than an inner diameter D1 of the outer ring raceway surface 21. The bent portion 24 overlaps the ball 11 when viewed in the axial direction, and defines an overlap allowance δ1 of (Do−D1)/2.

The inner diameter D1 of the outer ring raceway surface 21 is substantially the same as a diameter of a circumscribed circle of the plurality of balls 11.

Accordingly, the bent portion 24 abuts on the balls 11 even when the outer ring 20 moves apart relative to the balls 11 in the axial direction, so that the outer ring 20 and the balls 11 would not be separated.

Similarly, in the inner ring 30, the bent portion 34 (chamfered portion 34a) has an outer diameter Di that is larger than an outer diameter D2 of the inner ring raceway surface 31. The bent portion 34 overlaps the ball 11 when viewed in the axial direction, and defines an overlap allowance δ2 of (Di−D2)/2.

The outer diameter D2 of the inner ring raceway surface 31 is substantially the same as a diameter of an inscribed circle of the plurality of balls 11.

Accordingly, the bent portion 34 abuts on the balls 11 even when the inner ring 30 moves apart relative to the balls 11 in the axial direction, so that the inner ring 30 and the balls 11 would not be separated.

The outer ring 20 and the inner ring 30 are formed into desired shapes illustrated in FIG. 1 as a whole by a series of pressing including a step of bending the bent portions 24 and 34 in the radial direction from a plate member of an alloy material or a steel material.

Thereafter, necessary portions including the outer ring raceway surface 21 and the inner ring raceway surface 31 are subjected to heat treatment including carburizing and quenching, induction hardening, and the like. Further, the outer ring raceway surface 21 and the inner ring raceway surface 31 are subjected to a finishing process such as superfinishing (SF), deburring, and scaling.

In assembling the angular ball bearing 10, first, the plurality of balls 11 are assembled into the cage 12, and then the balls 11 held by the cage 12 are assembled into the outer ring 20 over the bent portions 24.

Further, the inner ring 30 is inserted in a state in which the outer ring 20 is thermally expanded to twice the inner ring overlap allowance δ2, and the plurality of balls 11 are assembled into the inner ring 30 over the bent portions 34 of the inner ring 30. Thereafter, when the outer ring 20 is cooled, the balls 11 would not be separated due to the bent portions 24 and 34.

The pressing of bending the bent portions 24 and 34 in the radial direction may be performed separately from the pressing of forming a shape except the bent portions 24 and 34 after the outer ring 20 and the inner ring 30 are subjected to the heat treatment.

In any case, the manufacturing cost can be reduced since neither the outer ring raceway surface 21 nor the inner ring raceway surface 31 is subjected to expensive grinding.

The plate thickness to of the step portion 23a is 40% to 75% of the plate thickness t1 of the part where the outer ring raceway surface 21 is formed. This is because, when the plate thickness to of the step portion 23a is less than 40% of the plate thickness t1, the bent portion 24 is easy to deform and it is difficult to hold the balls 11, and when the plate thickness to exceeds 75% of the plate thickness t1, it is difficult to form the bent portion 24 by pressing.

By providing the step portion 23a having the plate thickness to on the inner circumferential surface of the outer ring 20 and the bent portion 24 having a small plate thickness to, when the bent portion 24 is pressed, the bent portion 24 can be formed without affecting the shape and accuracy of the outer ring raceway surface 21 by deforming the bent portion 24 from the step portion 23a separated in the axial direction from the outer ring raceway surface 21.

For the same reason as the outer ring extending portion 23, the plate thickness ti of the inner ring extending portion 33 is set to be 40% to 75% of the plate thickness t2 of the inner ring raceway surface 31. For the same reason as the step portion 23a of the outer ring 20, the step portion 33a is formed on the outer circumferential surface of the inner ring 30.

According to the angular ball bearing 10 in the present embodiment as described above, at least one of the outer ring 20 and the inner ring 30 is formed by pressing, and the outer ring raceway surface 21 and the inner ring raceway surface 31 are formed without expensive grinding. Accordingly, the manufacturing cost can be reduced. Since the outer ring 20 and the inner ring 30 are provided with the bent portions 24 and 34 having the overlap allowances δ1 and δ2, respectively, the bent portions 24 and 34 abut against the balls 11 and prevent separation of the balls 11 and the outer ring 20 or the inner ring 30, thereby improving handleability of the angular ball bearing 10.

In the above embodiment, the bent portions 24 and 34 are formed over the entire circumferences of the outer ring extending portion 23 and the inner ring extending portion 33. Alternatively, the bent portions 24 and 34 may be formed at least at two portions in the circumferential direction such that the outer ring 20 or the inner ring 30 would not be separated.

Figure 3:
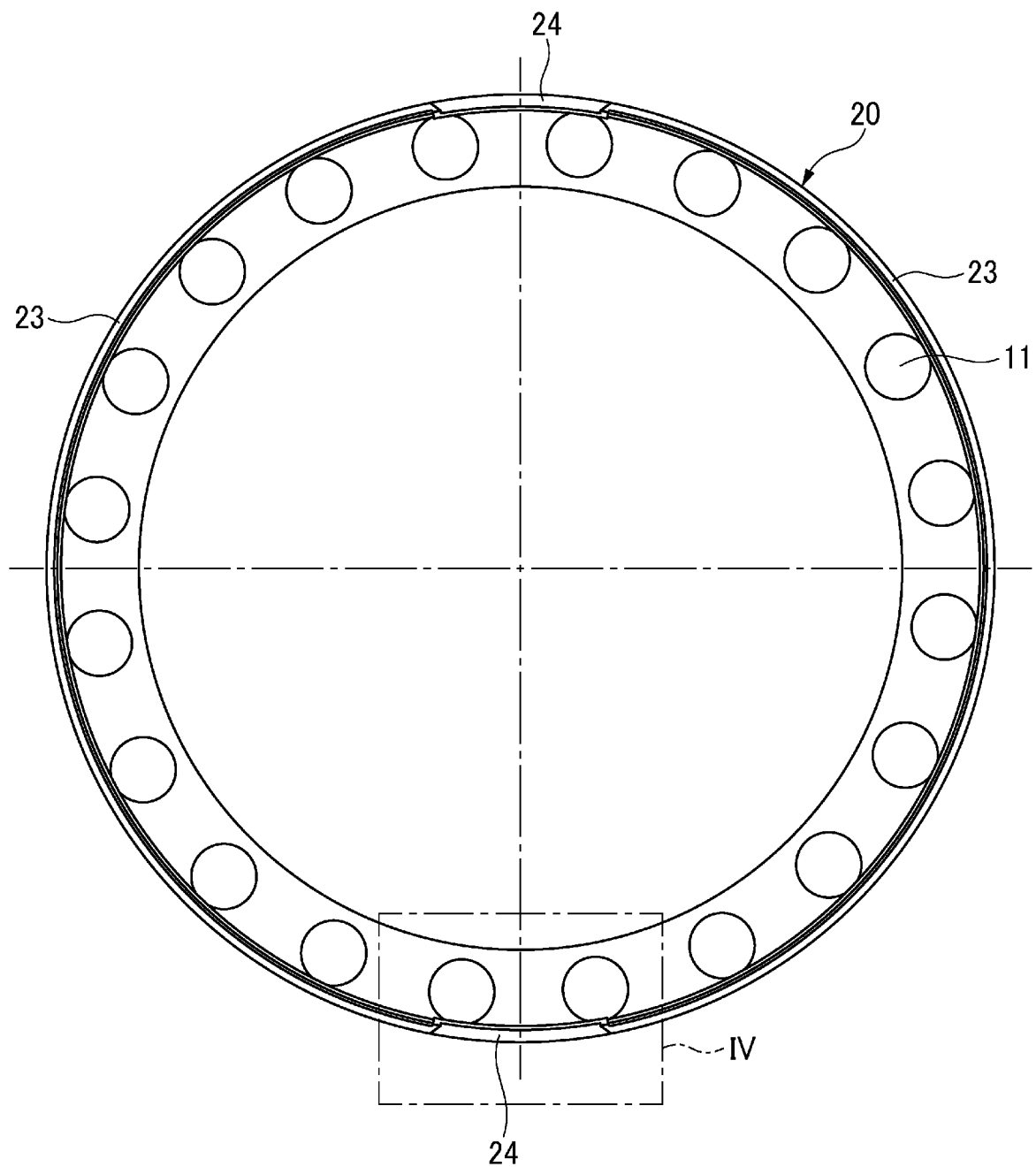
FIG. 3 is a side view illustrating an outer ring and a plurality of balls according to a modification of the first embodiment.
Figure 4A:
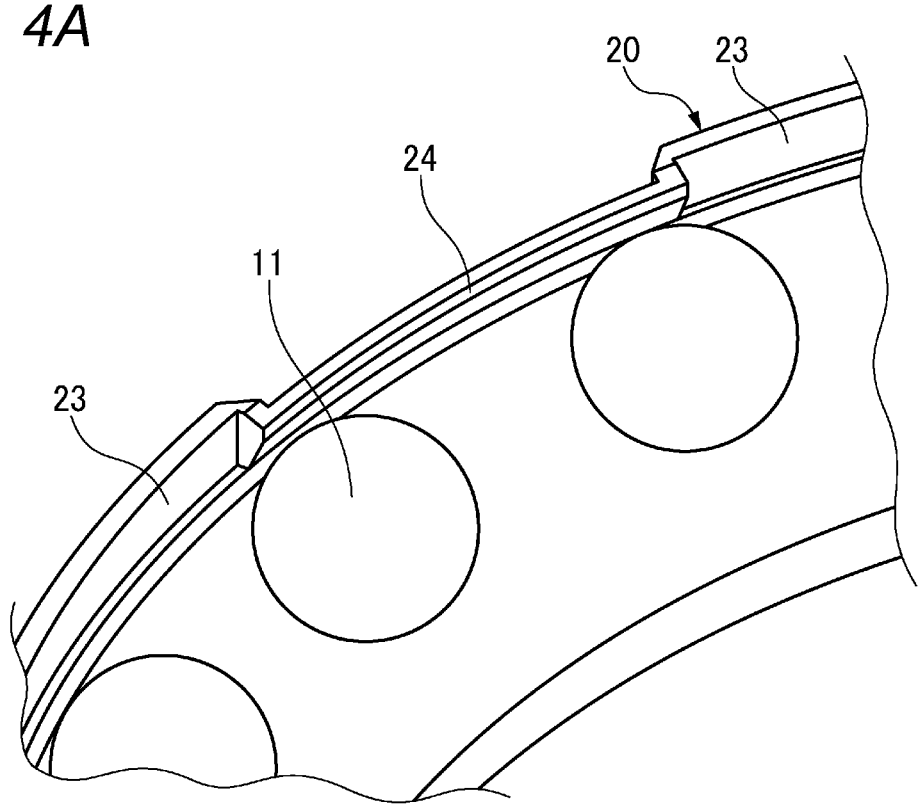
FIG. 4A is an enlarged perspective view of a bent portion of the outer ring in FIG. 3.
Figure 4B:
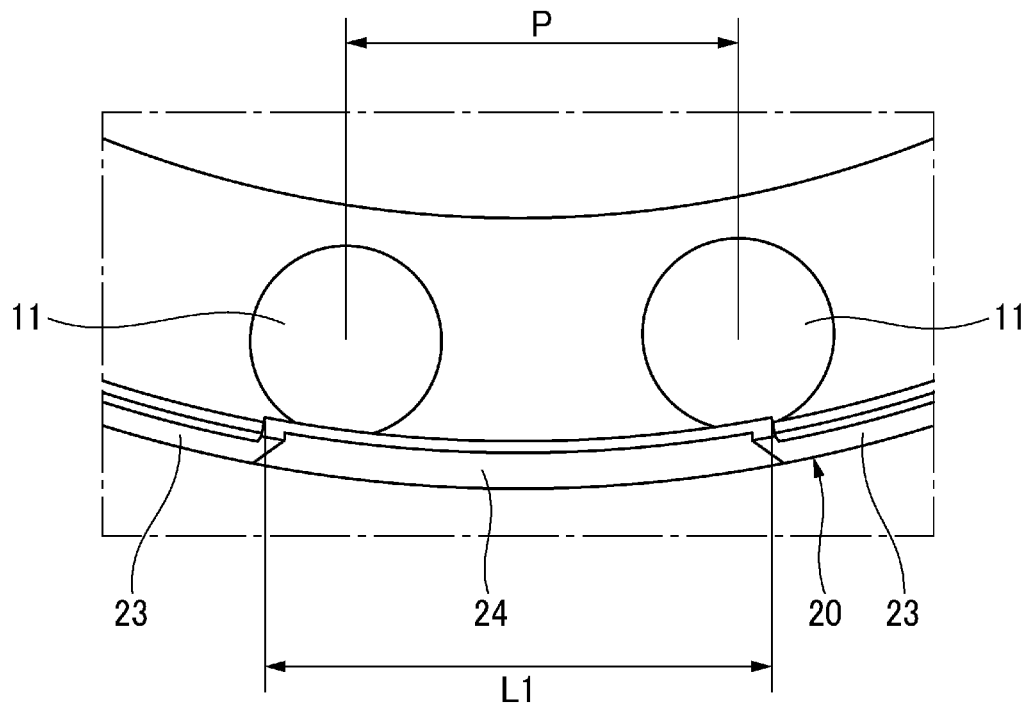
FIG. 4B is an enlarged view of a part surrounded by a dash-dotted line IV in FIG. 3.

For example, as illustrated in FIG. 3 and FIGS. 4A and 4B, the outer ring extending portion 23 is provided with the bent portion 24 at two portions in the circumferential direction (in this example, two portions having a phase difference of 180°).

As illustrated in FIG. 4B, a circumferential length L1 of the bent portion 24 is larger than a pitch P that is a circumferential interval between adjacent balls 11. Accordingly, the bent portion 24 normally abuts on any of the balls 11 and holds the balls 11, so that the outer ring 20 and the balls 11 would not be separated.

Figure 5A:
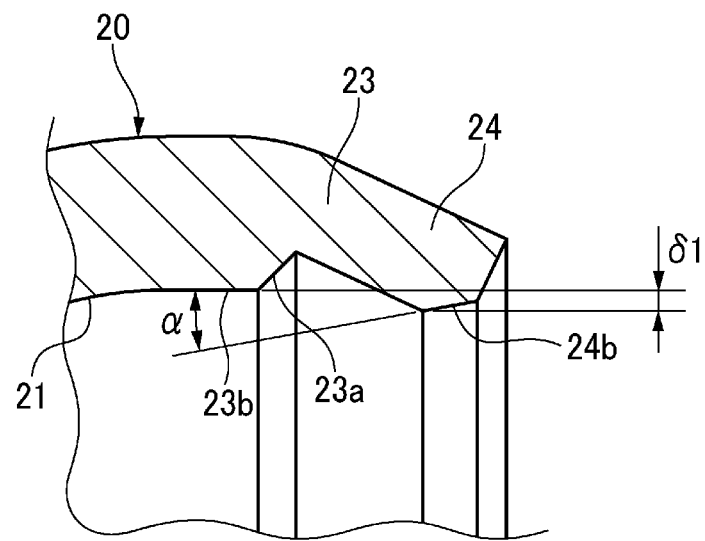
FIG. 5A is a sectional view illustrating a shape of a bent portion of an outer ring according to another modification of the first embodiment.

As illustrated in FIG. 5A, the bent portion 24 of the outer ring 20 may be provided with, by pressing at the tip portion of the inner circumferential surface thereof, a tapered portion 24b having a taper angle of $\alpha = 3°$ to $10°$ relative to the axis X of the angular ball bearing 10 and having an increasing diameter toward the one side in the axial direction. Accordingly, the balls 11 are easy to be assembled to the outer ring 20, and are difficult to come off after the assembly.

Figure 5B:
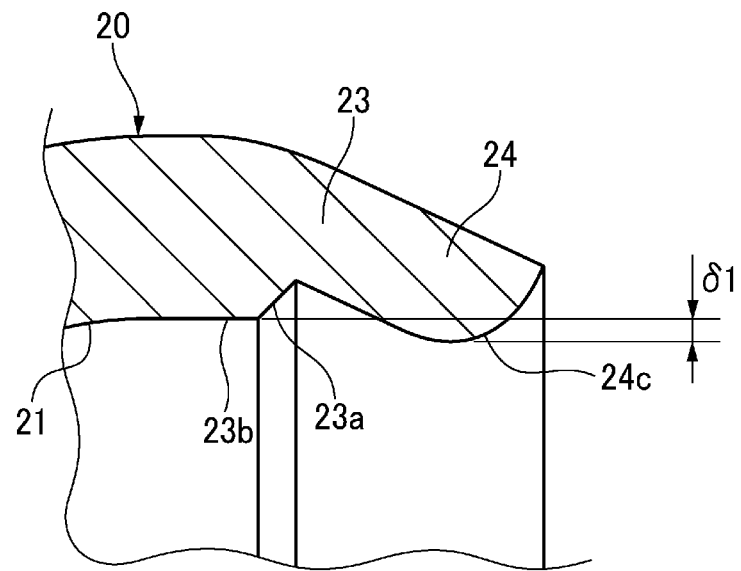
FIG. 5B is a sectional view illustrating a shape of a bent portion of an outer ring according to still another modification of the first embodiment.

As illustrated in FIG. 5B, the bent portion 24 of the outer ring 20 may be provided with a curved chamfered portion 24c at the tip portion of the inner circumferential surface thereof. This can prevent the balls 11 from being damaged when the balls 11 are assembled to the outer ring 20.

Although not illustrated, for the same reason as that of the bent portion 24 of the outer ring 20, the tip portion of the inner circumferential surface of the bent portion 34 of the inner ring 30 may also be a tapered portion having a taper angle of $\alpha = 3°$ to $10°$ and having an increasing diameter toward the one side in the axial direction, or be a curved chamfered portion.

Second Embodiment

Figure 6:
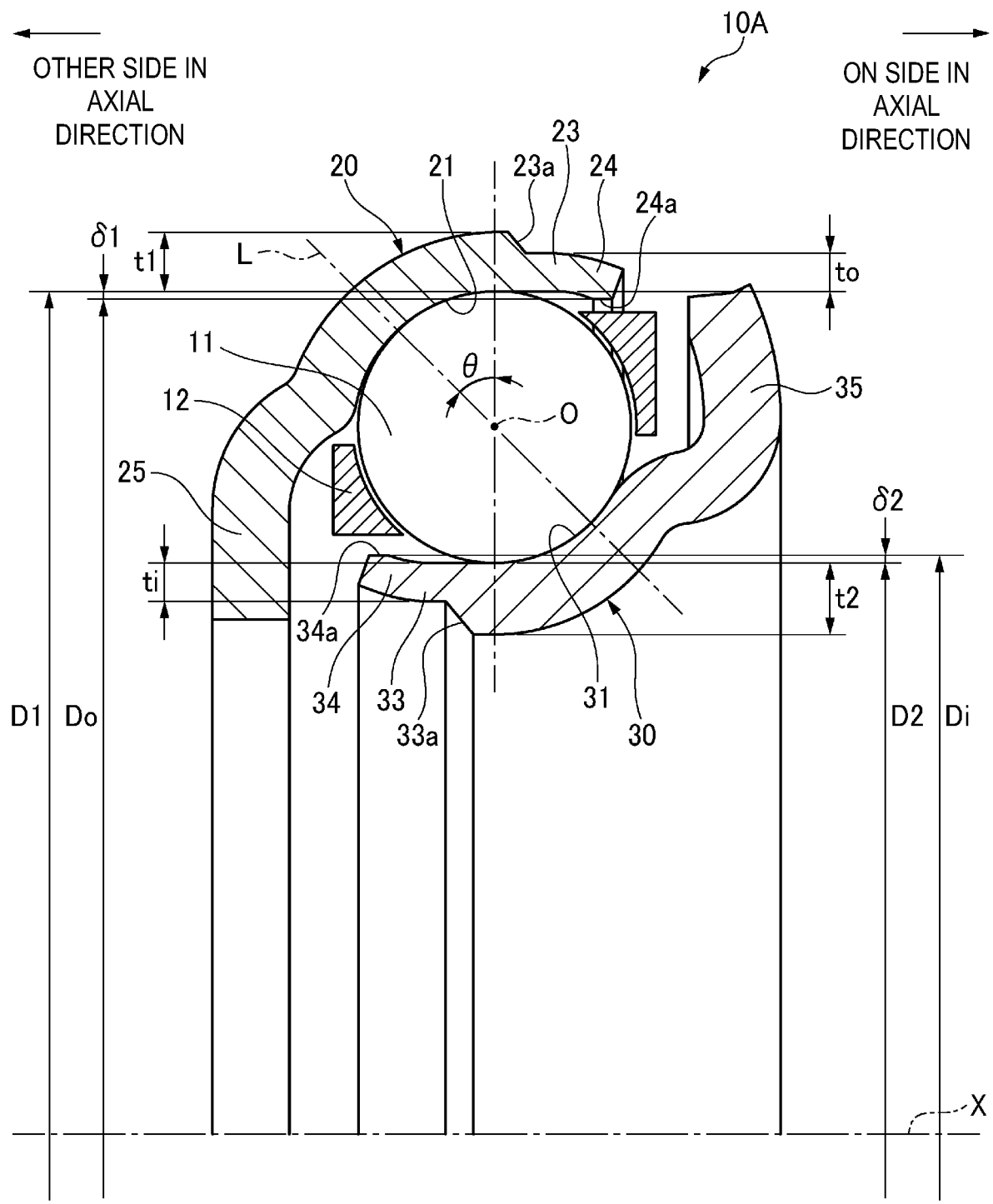
FIG. 6 is a sectional view of a main portion of an angular ball bearing according to a second embodiment of the present invention.

Next, an angular ball bearing 10A according to a second embodiment of the present invention will be described with reference to FIG. 6. The angular ball bearing 10A according to the second embodiment is different from the angular ball bearing 10 according to the first embodiment in shapes of the outer ring extending portion 23 of the outer ring 20 and the inner ring extending portion 33 of the inner ring 30.

In the present embodiment, the step portion 23a is formed on an outer circumferential surface of the outer ring 20 by pressing to deform an outer circumferential surface of the outer ring extending portion 23 to the inner diameter side relative to an outer circumferential surface of a part constituting the outer ring raceway surface 21. Similarly to the first embodiment, the plate thickness to of the step portion 23a is set to be 40% to 75% of the plate thickness t1 of the outer ring raceway surface 21.

The outer ring extending portion 23 is provided with the bent portion 24 in the entire circumference or at least at two portions in the circumferential direction, and the bent portion 24 has a reduced inner diameter by pressing at an end portion in the axial direction. The inner diameter Do of the bent portion 24 is set to be smaller than the inner diameter D1 of the outer ring raceway surface 21. That is, the bent portion 24 overlaps the ball 11 when viewed from the axial direction, and defines the overlap allowance $\delta 1$ of (Do−D1)/2.

The step portion 33a is formed on an inner circumferential surface of the inner ring 30 by pressing to deform an inner circumferential surface of the inner ring extending portion 33 to the outer diameter side relative to an inner circumferential surface of a part constituting the inner ring raceway surface 31. The plate thickness ti of the step portion 33a is formed to be 40% to 75% of the plate thickness t2 of the inner ring raceway surface 31.

The inner ring extending portion 33 is provided with the bent portion 34 in the entire circumference or at least at two portions in the circumferential direction, and the bent portion 34 has an increased outer diameter by pressing at an end portion in the axial direction. The outer diameter Di of the bent portion 34 is set to be larger than the outer diameter D2 of the inner ring raceway surface 31. That is, the bent portion 34 overlaps the ball 11 when viewed from the axial direction, and defines an overlap allowance $\delta 2$ of (Di−D2)/2.

According to the outer ring 20 and the inner ring 30 in the present embodiment, no step portion is provided on the inner circumferential surfaces of the outer ring extending portion 23 and the bent portion 24 formed continuously on the outer ring raceway surface 21 or the outer circumferential surfaces of the inner ring extending portion 33 and the bent portion 34 formed continuously on the inner ring raceway surface 31. Accordingly, the balls 11 are less likely to be damaged when being assembled to the outer ring 20 and the inner ring 30.

Other configurations and operations are the same as those of the angular ball bearing 10 according to the first embodiment.

Third Embodiment

Figure 7:
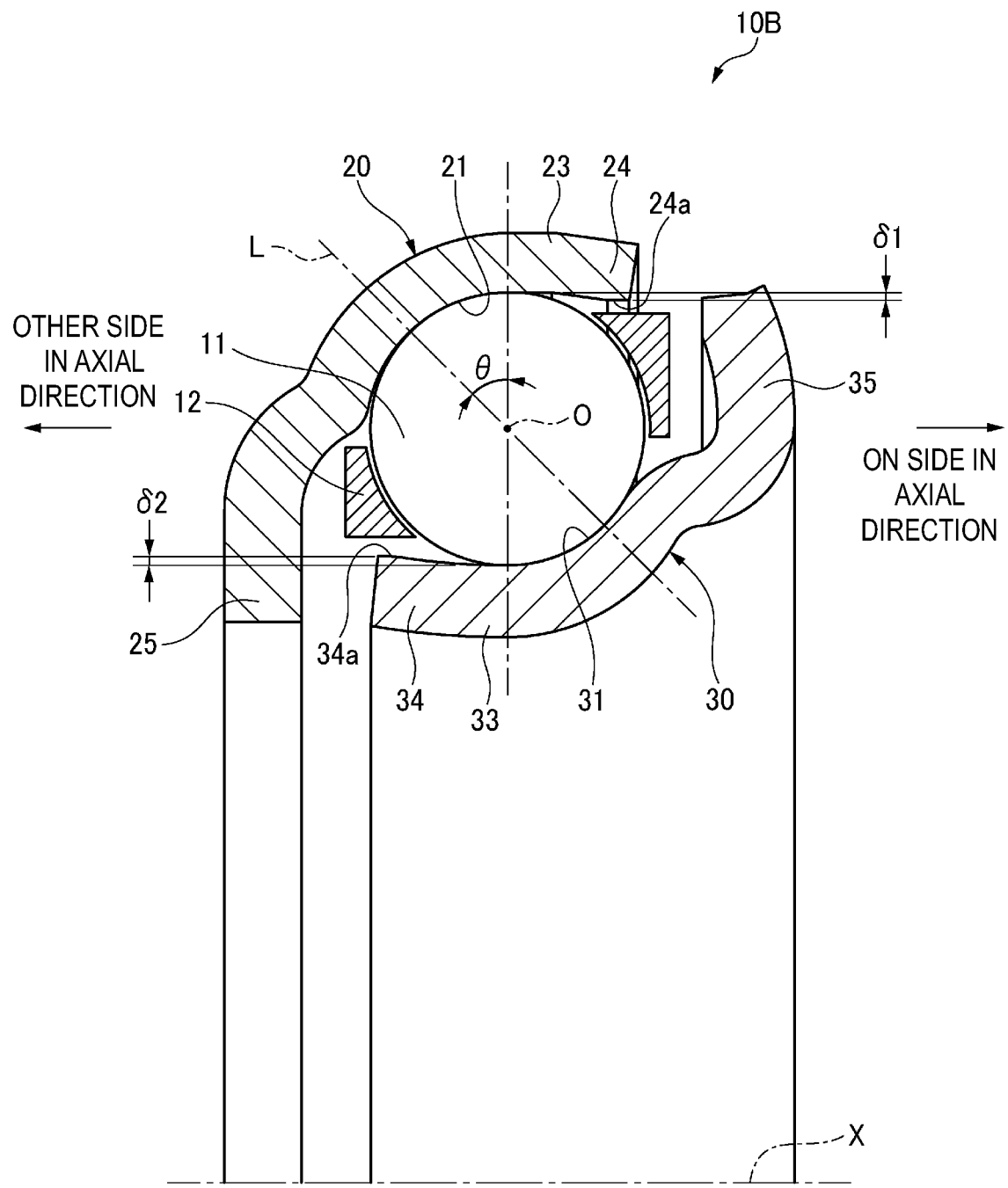
FIG. 7 is a sectional view of a main portion of an angular ball bearing according to a third embodiment of the present invention.

Next, an angular ball bearing 10B according to a third embodiment will be described with reference to FIG. 7.

Also in the angular ball bearing 10B according to the present embodiment, shapes of the outer ring extending portion 23 of the outer ring 20 and the inner ring extending portion 33 of the inner ring 30 are different from those of the angular ball bearing 10 according to the first embodiment.

In the third embodiment, no step portion is provided between the outer ring raceway surface 21 and the bent portion 24 of the outer ring 20 or between the inner ring raceway surface 31 and the bent portion 34 of the inner ring 30, a part where the outer ring raceway surface 21 is formed has the same thickness as the outer ring extending portion 23, and a part where the inner ring raceway surface 31 is formed has the same thickness as the inner ring extending portion 33.

The outer ring extending portion 23 of the outer ring 20 is tapered from a vicinity of a part of the outer ring raceway surface 21 that has a largest diameter to form the bent portion 24. The inner ring extending portion 33 of the inner ring 30 is tapered from a vicinity of a part of the inner ring raceway surface 31 that has a minimum diameter to form the bent portion 34. Accordingly, the bent portion 24 has the overlap allowance 81 with the ball 11, and the bent portion 34 has the overlap allowance 82 with the ball 11.

The angular ball bearing 10B according to the present embodiment may be formed by the same method as that of the first embodiment, and may be formed by another method.

For example, the outer ring 20 and the inner ring 30 are formed by pressing a plate member of an alloy material or a steel material, and the remaining parts of the outer ring 20 and the inner ring 30 are formed into desired shapes except the bending of the outer ring extending portion 23 and the inner ring extending portion 33 in the radial direction.

Thereafter, except the outer ring extending portion 23 and the inner ring extending portion 33, necessary portions including the outer ring raceway surface 21 and the inner ring raceway surface 31 are subjected to heat treatment including carburizing and quenching, high-frequency quenching, and the like. Further, the outer ring raceway surface 21 and the inner ring raceway surface 31 are subjected to a finishing process such as superfinishing (SF), deburring, and scaling. The outer ring extending portion 23 and the inner ring extending portion 33 may be softened after the heat treatment.

Thereafter, after the plurality of balls 11 are assembled into the outer ring 20 and the inner ring 30, the outer ring extending portion 23 and the inner ring extending portion 33 may be pressed to be bent in the radial direction to form the bent portions 24 and 34 in the outer ring 20 and the inner ring 30.

In this case, the outer ring extending portion 23 and the inner ring extending portion 33 including the bent portions 24 and 34 has a hardness that is 15% to 30% of the hardness of the outer ring raceway surface 21 and the inner ring raceway surface 31, and the bent portions 24 and 34 can be easily formed without affecting shapes and accuracy of the outer ring raceway surface 21 and the inner ring raceway surface 31 even when the part where the outer ring raceway surface 21 is formed has the same plate thickness as the outer ring extending portion 23 and the part where the inner ring raceway surface 31 is formed has the same plate thickness as the inner ring extending portion 33.

Other configurations and operations are the same as those of the first embodiment.

Fourth Embodiment

Figure 8:
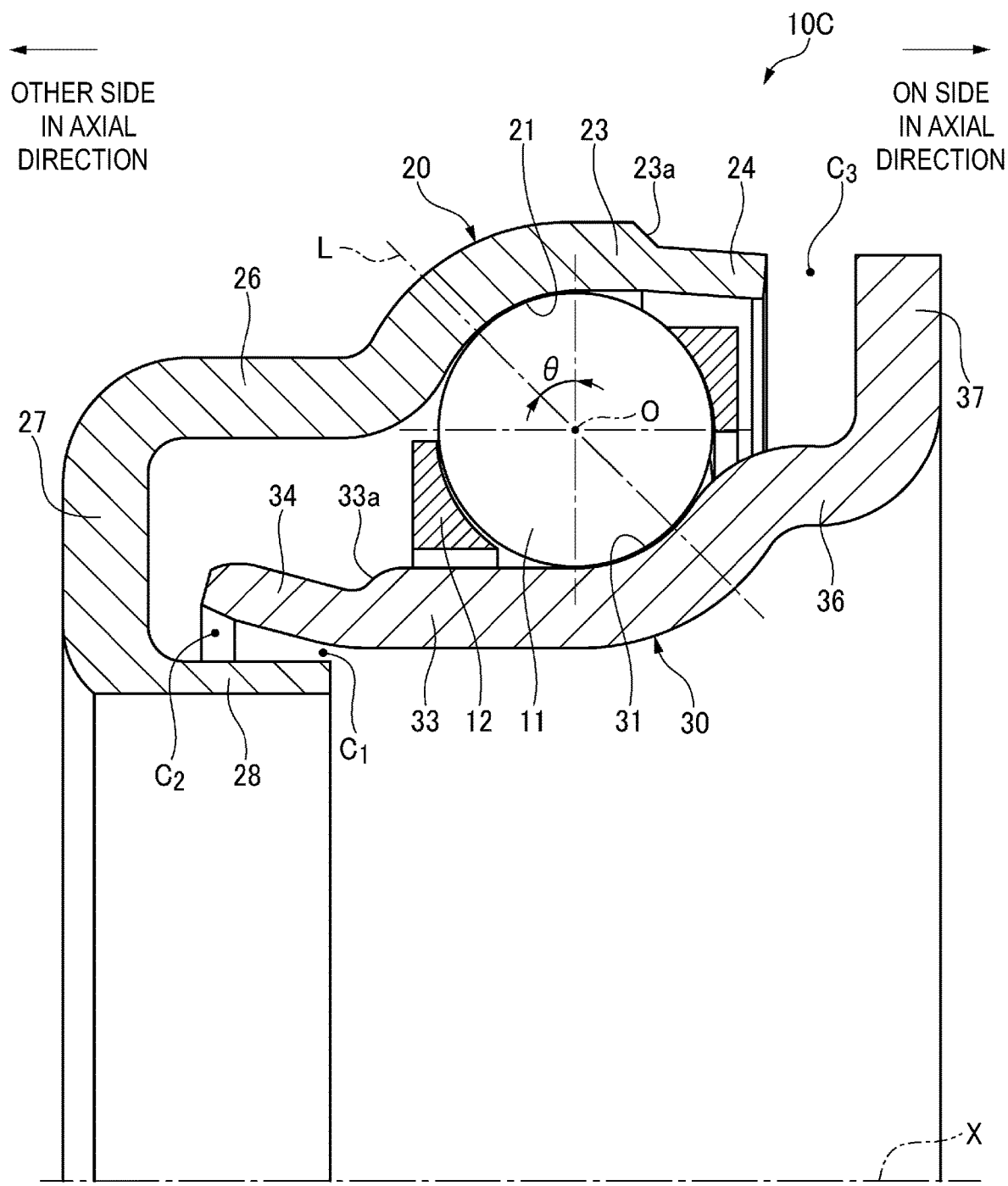
FIG. 8 is a sectional view of a main portion of an angular ball bearing according to a fourth embodiment of the present invention.
Figure 9B:
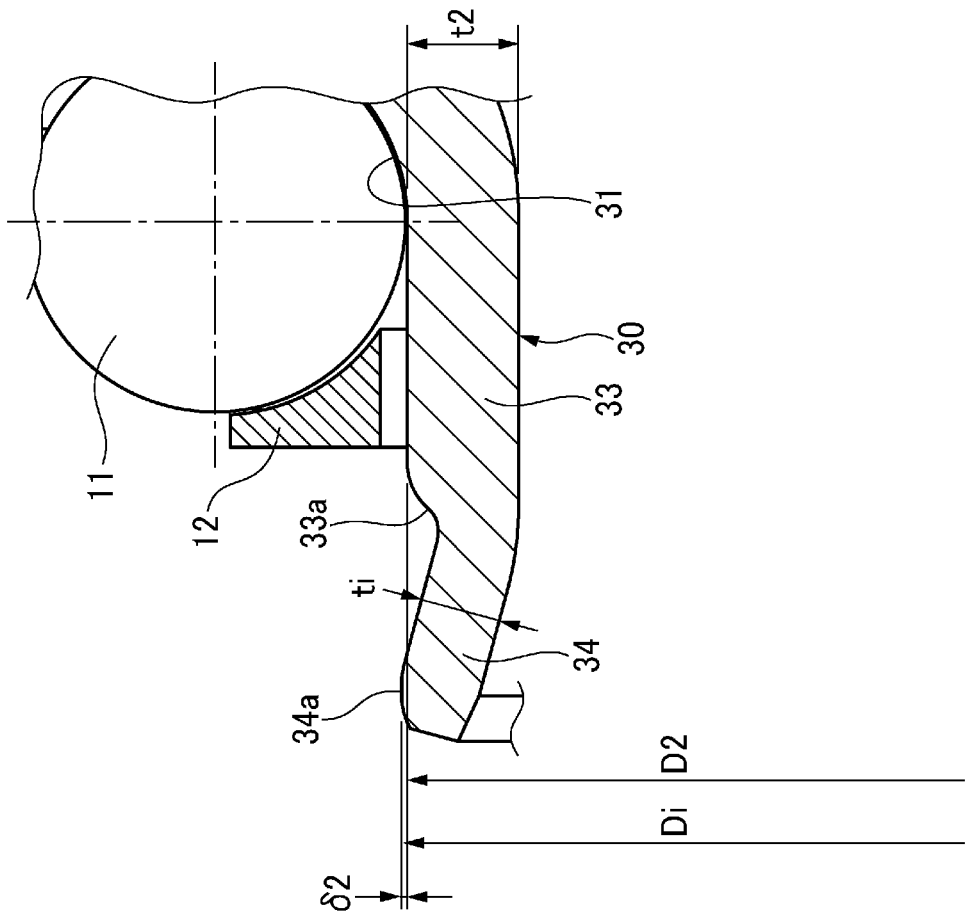
FIG. 9B is an enlarged view of a main portion of an inner ring in FIG. 8.
Figure 9A:
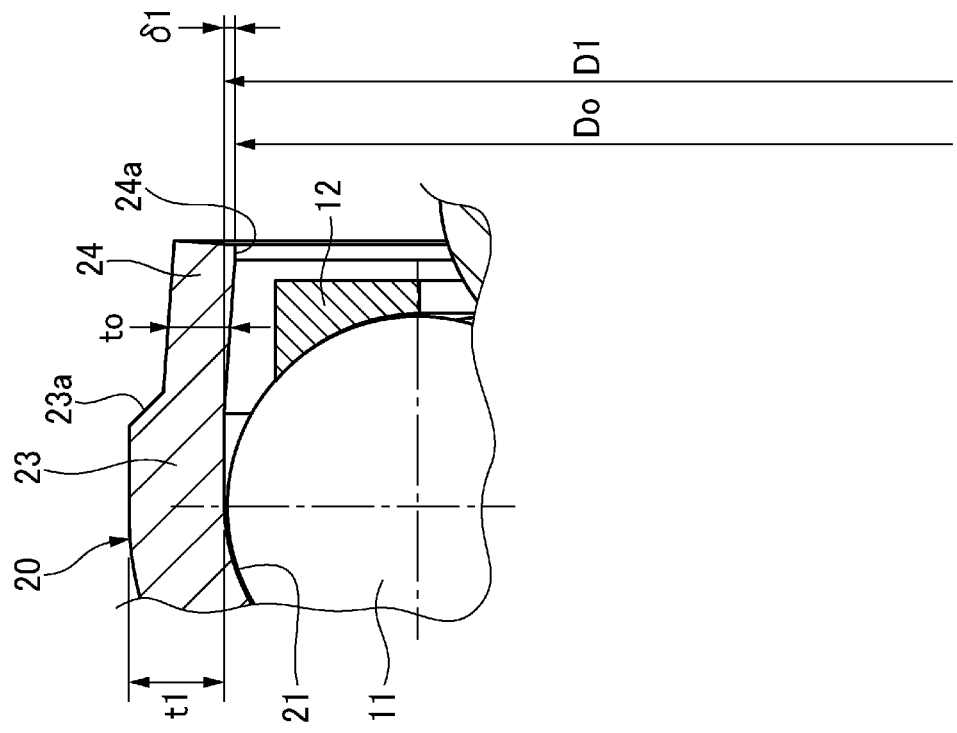
FIG. 9A is an enlarged view of a main portion of an outer ring in FIG. 8.

Next, an angular ball bearing 10C according to a fourth embodiment of the present invention will be described with reference to FIG. 8 and FIGS. 9A and 9B. In the angular ball bearing 10C according to the fourth embodiment, the bent portion 24 in the second embodiment is applied to the outer ring extending portion 23, and the bent portion 34 in the first embodiment is applied to the inner ring extending portion 33.

Specifically, the outer ring 20 is provided with the outer ring extending portion 23 extending from the outer ring raceway surface 21 to the one side in the axial direction, and the outer ring extending portion 23 is provided with the step portion 23a on the outer circumferential surface. The outer ring extending portion 23 is provided with the bent portion 24, which has the overlap allowance δ1 with the ball 11, at two portions different in phase by 180°.

The outer ring 20 includes a cylindrical outer ring small-diameter portion 26 extending from the outer ring raceway surface 21 to the other side in the axial direction, a radial wall portion 27 extending from an axial end portion of the outer ring small-diameter portion 26 to the inner diameter side, and a folded-back portion 28 extending from a radially inner end portion of the radial wall portion 27 to the one side in the axial direction.

Accordingly, a part opposite to the outer ring extending portion 23 in the axial direction is formed into a substantially U-shaped cross section. A part of the folded-back portion 28 radially overlaps an inner diameter side of a bent portion 34 of the inner ring 30, which will be described later, via a radial gap.

The inner ring 30 is provided with the inner ring extending portion 33 extending from the inner ring raceway surface 31 to the other side in the axial direction, and the inner ring extending portion 33 is provided with the step portion 33a on the outer circumferential surface. The inner ring extending portion 33 is formed with the bent portion 34 that is pressed to be radially bent over the entire circumference of the inner ring extending portion 33 and has the overlap allowance δ2 with the ball 11.

The inner ring 30 includes an inner ring large-diameter portion 36 extending from the inner ring raceway surface 31 to the one side in the axial direction, and a radial wall portion 37 extending from an axial end portion of the inner ring large-diameter portion 36 to the outer diameter side. The radial wall portion 37 axially overlaps an end surface on the one side in the axial direction of the bent portion 24 of the outer ring 20, and an outer diameter side outlet gap C3 that is an axial gap is defined between the radial wall portion 37 and the axial end surface of the bent portion 24.

The radial gap defined by the overlapping of the folded-back portion 28 of the outer ring 20 and the bent portion 34 of the inner ring 30 includes an inner diameter side inlet gap C1 and an inner diameter side outlet gap C2. The inner diameter side inlet gap C1 is defined between an outer circumferential surface of an end portion of the folded-back portion 28 on the one side in the axial direction and an inner circumferential surface of the bent portion 34, and the inner diameter side outlet gap C2 is defined between an outer circumferential surface of the folded-back portion 28 and an inner circumferential surface of an end portion of the bent portion 34 on the other side in the axial direction. The outer circumferential surface of the folded-back portion 28 is formed in a cylindrical shape having a constant outer diameter, and the inner circumferential surface of the bent portion 34 is formed in a tapered shape having an increasing diameter toward the other side in the axial direction, and thus the inner diameter side outlet gap C2 is larger than the inner diameter side inlet gap C1 (C1<C2).

Further, the outer diameter side outlet gap C3, which is the axial gap between the radial wall portion 37 and the bent portion 24 of the outer ring 20, is set to be larger than the inner diameter side inlet gap C1 and the inner diameter side outlet gap C2. That is, sizes of the inner diameter side inlet gap C1, the inner diameter side outlet gap C2, and the outer diameter side outlet gap C3 increase in this order (C1<C2<C3).

Since the inner diameter side inlet gap C1 is smaller than the inner diameter side outlet gap C2, the amount of lubricating oil supplied from the inner diameter side inlet gap C1 to an internal space of the angular ball bearing 10C can be controlled to an appropriate amount, and the lubricating oil can smoothly flow into the angular ball bearing 10C from the inner diameter side outlet gap C2. Since the outer circumferential surface of the bent portion 34 is formed in a tapered shape having an increasing diameter toward the other side in the axial direction, the lubricating oil can be shaken off toward the outer ring 20 from the end portion of the bent portion 34 on the other side in the axial direction by a centrifugal force acting on the inner ring 30 that is a rotary ring.

Since the outer diameter side outlet gap C3 is larger than the inner diameter side outlet gap C2, the lubricating oil inside the angular ball bearing 10C is smoothly discharged to the outside of the angular ball bearing 10C without staying inside, and the stirring resistance of the lubricating oil is reduced. In this way, by controlling the amount and flow of the lubricating oil, the stirring resistance of the lubricating oil can be reduced to reduce the torque.

In particular, since the bent portion 24 of the outer ring 20 is provided at two or more portions in the circumferential direction, the lubricating oil adhering to the inner circumferential surface of the outer ring 20 can be fed toward the outer diameter side outlet gap C3 through a part of the outer ring extending portion 23 that extends along the axial direction.

Accordingly, according to the present embodiment, the angular ball bearing 10C can be manufactured at low cost, and has good handleability by preventing separation of the outer ring 20, the inner ring 30 and the balls 11, the amount and flow of the lubricating oil can be controlled, and the stirring resistance of the lubricating oil can be reduced to reduce the torque.

Other configurations and operations are the same as those of the first embodiment.

The present invention is not limited to the above-described embodiments and modifications, and modifications, improvements, and the like can be appropriately made.

In the above embodiments, both the outer ring 20 and the inner ring 30 are formed by pressing. Alternatively, the present invention is not limited thereto, and at least one of the outer ring 20 and the inner ring 30 may be formed by pressing as described in the above embodiments.

As described above, the following matters are disclosed in the present specification.

(1) An angular ball bearing, the angular ball bearing including an outer ring having an outer ring raceway surface on an inner circumferential surface of the outer ring, an inner ring having an inner ring raceway surface on an outer circumferential surface of the inner ring, a plurality of balls being rollable between the outer ring raceway surface and the inner ring raceway surface at a contact angle, and a cage holding the plurality of balls at predetermined intervals in a circumferential direction, a bearing ring of at least one of the outer ring and the inner ring being a press-formed product of a steel plate, wherein the bearing ring includes an extending portion extending in an axial direction from the raceway surface toward a side opposite to a side on which a line of action of the contact angle relative to a center of the ball passes through the raceway surface, and the extending portion has a bent portion bent in a radial direction, and the bent portion is provided in an entire circumference or at least at two portions in a circumferential direction, overlaps the ball when viewed from the axial direction, and defines an overlap allowance.

According to this configuration, since the bent portion overlaps the ball when viewed from the axial direction and defines the overlap allowance, and the bearing ring having the bent portion is formed by pressing. Accordingly, the angular ball bearing can be manufactured at low cost, and has improved handleability by preventing separation of the bearing ring and the ball.

(2) The angular ball bearing according to (1), wherein the bent portion has a circumferential length larger than a circumferential pitch of the balls.

According to this configuration, the bent portion is normally engaged with any of the balls, and thus separation of the bearing ring and the balls is prevented.

(3) The angular ball bearing according to (1) or (2), wherein a tip portion of the bent portion on a circumferential surface on a side on which the overlap allowance is defined is formed into a tapered shape having a taper angle of 3° to 10°.

According to this configuration, the tip portion of the bent portion is formed into a tapered shape, so that the balls can be easily assembled to the bearing ring and hardly separated.

(4) The angular ball bearing according to (1) or (2), wherein a tip portion of the bent portion on a circumferential surface on a side on which the overlap allowance is defined is chamfered in a curved shape.

According to this configuration, the balls can be prevented from damage when being assembled to the bearing ring.

(5) The angular ball bearing according to (3) or (4), wherein the extending portion has a step portion between the raceway surface and the bent portion, and the step portion is formed on the extending portion on a circumferential surface on the side on which the overlap allowance is defined.

According to this configuration, the bent portion can be formed by bending at the step portion, and an influence on the raceway surface can be prevented.

(6) The angular ball bearing according to (3) or (4), wherein the extending portion has a step portion between the raceway surface and the bent portion, and the step portion is formed on the extending portion on a circumferential surface on a side opposite to the side on which the overlap allowance is defined.

According to this configuration, the bent portion can be formed by bending at the step portion, and an influence on the raceway surface can be prevented.

(7) The angular ball bearing according to (5) or (6), wherein the step portion has a thickness that is 40% to 75% of a thickness of the raceway surface.

According to this configuration, the bent portion can be more easily formed by pressing without affecting the raceway surface.

(8) The angular ball bearing according to any one of (1) to (4), wherein a part where the raceway surface is formed has the same thickness as a thickness of the extending portion, and the extending portion has a hardness that is 15% to 30% of a hardness of the part where the raceway surface is formed.

According to this configuration, the hardness of the extending portion is set to be 15% to 30% of the hardness of the raceway surface, so that the bent portion can be easily formed even when the thickness of the raceway surface is the same as the thickness of the extending portion.

(9) The angular ball bearing according to any one of (1) to (7), wherein the outer ring further includes an outer ring extending portion extending in the axial direction from the outer ring raceway surface toward one side in the axial direction which is the side opposite to the side on which the line of action of the contact angle relative to the center of the ball passes through the outer ring raceway surface, an outer ring small-diameter portion extending toward another side in the axial direction relative to the outer ring raceway surface, a radial wall portion extending toward an inner diameter side from an axial end portion of the outer ring small-diameter portion, and a folded-back portion extending toward the one side in the axial direction from a radial inner end portion of the radial wall portion, the outer ring extending portion has a bent portion radially bent at least at two portions in the circumferential direction, the inner ring includes an inner ring extending portion extending in the axial direction from the inner ring raceway surface toward the side opposite to the side on which the line of action of the contact angle relative to the center of the ball passes through the inner ring raceway surface, the inner ring extending portion has a bent portion radially bent over the entire circumference, the folded-back portion has a radial gap between the folded-back portion and an inner circumferential surface of the inner ring extending portion, and overlaps the inner ring extending portion in the radial direction, and the radial gap at an inner diameter side inlet defined by an outer circumferential surface of an axial end portion of the folded-back portion and the inner circumferential surface of the inner ring extending portion is smaller than the radial gap at an inner diameter side outlet defined by an inner circumferential surface of an axial end portion of the inner ring extending portion and an outer circumferential surface of the folded-back portion.

According to this configuration, the bearing ring and the balls cannot be separated, the amount and flow of the lubricating oil can be controlled, and the stirring resistance of the lubricating oil can be reduced to reduce the torque.

REFERENCE SIGNS LIST 10, 10A, 10B, 10C angular ball bearing
11 ball
12 cage
20 outer ring (bearing ring)
21 outer ring raceway surface
23 extending portion, outer ring extending portion
23a, 33a step portion
24, 34 bent portion
24c curved chamfered portion
26 outer ring small-diameter portion
27 radial wall portion
28 folded-back portion
30 inner ring (bearing ring)
31 inner ring raceway surface
33 extending portion, inner ring extending portion
C1 inner diameter side inlet gap (inner diameter side inlet radial gap)
C2 inner diameter side outlet gap (inner diameter side outlet radial gap)

C3 outer diameter side outlet gap (outer diameter side outlet axial gap)
L line of action of contact angle
P circumferential pitch of ball
t1, t2 plate thickness (thickness of part where raceway surface is formed)
ti, to plate thickness (thickness of extending portion)
δ1, δ2 overlap allowance
θ contact angle

The invention claimed is:

1. An angular ball bearing, the angular ball bearing including an outer ring having an outer ring raceway surface on an inner circumferential surface of the outer ring, an inner ring having an inner ring raceway surface on an outer circumferential surface of the inner ring, a plurality of balls being rollable between the outer ring raceway surface and the inner ring raceway surface at a contact angle, and a cage holding the plurality of balls at predetermined intervals in a circumferential direction, a bearing ring of at least one of the outer ring and the inner ring being a press-formed product of a steel plate, wherein
the bearing ring includes an extending portion extending in an axial direction from the raceway surface toward a side opposite to a side on which a line of action of the contact angle relative to a center of the ball passes through the raceway surface,
the extending portion has a bent portion bent in a radial direction, and the bent portion is provided in an entire circumference or at least at two portions in a circumferential direction, and the bent portion overlaps the ball when viewed from the axial direction so as to define an overlap allowance, and
a tip portion of the bent portion on a circumferential surface on a side, on which the overlap allowance is defined, is formed into a tapered shape having a taper angle of 3° to 10°.

2. The angular ball bearing according to claim 1, wherein the bent portion has a circumferential length larger than a circumferential pitch of the balls.

3. The angular ball bearing according to claim 1, wherein the extending portion has a step portion between the raceway surface and the bent portion, and the step portion is formed on the extending portion on a circumferential surface on the side on which the overlap allowance is defined.

4. The angular ball bearing according to claim 3, wherein the step portion has a thickness that is 40% to 75% of a thickness of the raceway surface.

5. The angular ball bearing according to claim 1, wherein the extending portion has a step portion between the raceway surface and the bent portion, and the step portion is formed on the extending portion on a circumferential surface on a side opposite to the side on which the overlap allowance is defined.

6. The angular ball bearing according to claim 1, wherein a part where the raceway surface is formed has the same thickness as a thickness of the extending portion, and the extending portion has a hardness that is 15% to 30% of a hardness of the part where the raceway surface is formed.

7. An angular ball bearing, the angular ball bearing including an outer ring having an outer ring raceway surface on an inner circumferential surface of the outer ring, an inner ring having an inner ring raceway surface on an outer circumferential surface of the inner ring, a plurality of balls being rollable between the outer ring raceway surface and the inner ring raceway surface at a contact angle, and a cage holding the plurality of balls at predetermined intervals in a circumferential direction, wherein
the outer ring further includes an outer ring extending portion extending in the axial direction from the outer ring raceway surface toward one side in the axial direction which is the side opposite to the side on which the line of action of the contact angle relative to the center of the ball passes through the outer ring raceway surface, an outer ring small-diameter portion extending toward another side in the axial direction relative to the outer ring raceway surface, a radial wall portion extending toward an inner diameter side from an axial end portion of the outer ring small-diameter portion, and a folded-back portion extending toward the one side in the axial direction from a radial inner end portion of the radial wall portion,
the outer ring extending portion has an outer ring bent portion radially bent at least at two portions in a circumferential direction,
the inner ring includes an inner ring extending portion extending in the axial direction from the inner ring raceway surface toward the side opposite to the side on which the line of action of the contact angle relative to the center of the ball passes through the inner ring raceway surface,
the inner ring extending portion has an inner ring bent portion radially bent over an entire circumference,
the folded-back portion has a radial gap between the folded-back portion and an inner circumferential surface of the inner ring extending portion, and overlaps the inner ring extending portion in the radial direction,
the radial gap at an inner diameter side inlet defined by an outer circumferential surface of an axial end portion of the folded-back portion and the inner circumferential surface of the inner ring extending portion is smaller than the radial gap at an inner diameter side outlet defined by an inner circumferential surface of an axial end portion of the inner ring extending portion and an outer circumferential surface of the folded-back portion.

* * * * *